March 21, 1944. A. F. VICTOR 2,344,574
CAM-FLYWHEEL AND SHUTTER FOR MOTION PICTURE APPARATUS
Filed April 26, 1943 2 Sheets-Sheet 1
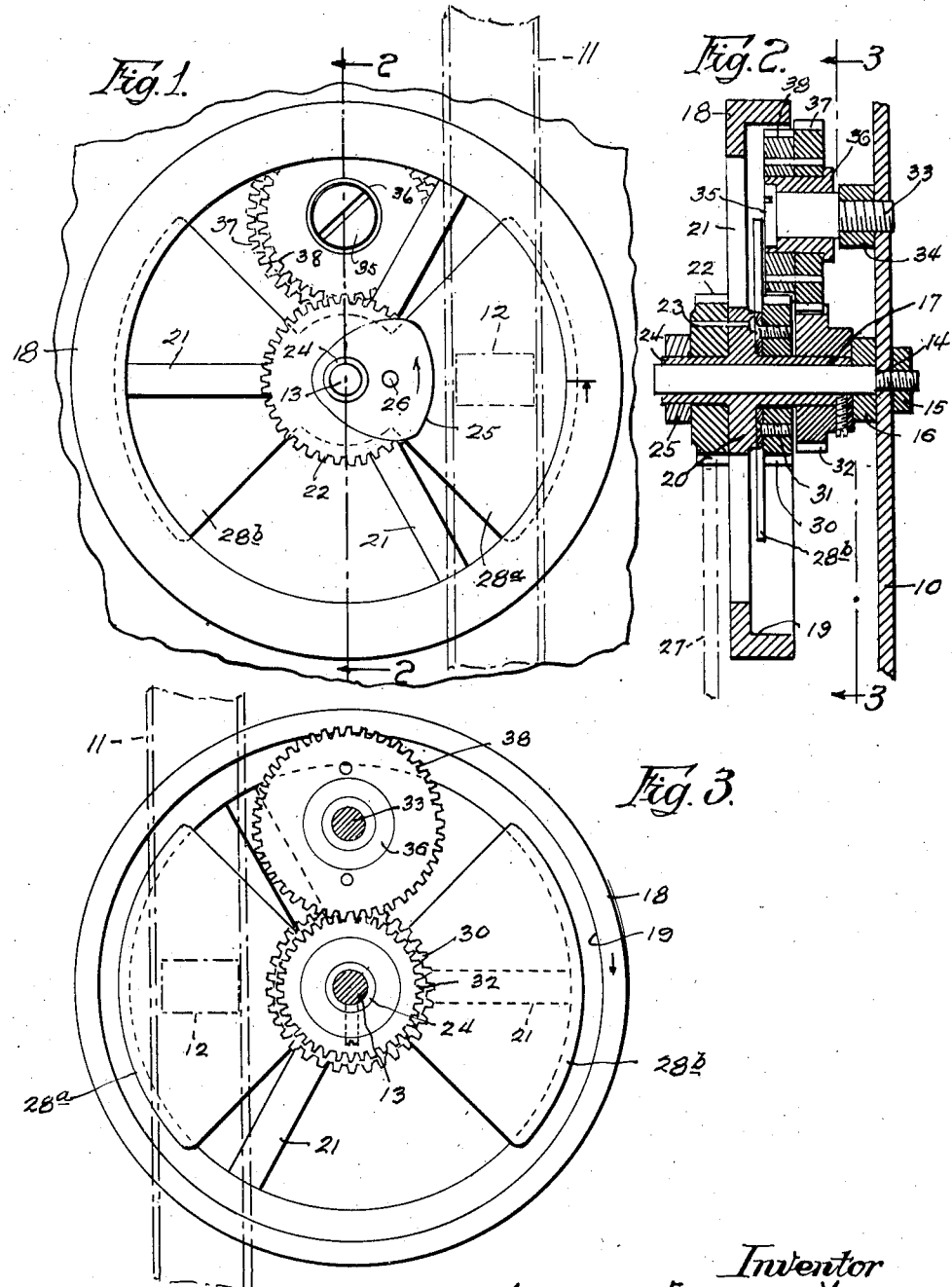
Inventor
ALEXANDER FERDINAND VICTOR
By:
Attorney.

March 21, 1944. A. F. VICTOR 2,344,574
CAM-FLYWHEEL AND SHUTTER FOR MOTION PICTURE APPARATUS
Filed April 26, 1943 2 Sheets-Sheet 2

Inventor:
ALEXANDER FERDINAND VICTOR
By:
Attorney.

Patented Mar. 21, 1944

2,344,574

UNITED STATES PATENT OFFICE 2,344,574

CAM FLYWHEEL AND SHUTTER FOR MOTION PICTURE APPARATUS

Alexander Ferdinand Victor, New York, N. Y.

Application April 26, 1943, Serial No. 484,662

10 Claims. (Cl. 88—18.4)

My present invention relates to devices for use in connection with motion picture apparatus. More particularly my improvements appertain to a shutter mechanism, a cam-flywheel and portions of the intermittent feed mechanism.

In the present device the interrupting shutter rotates within a recessed face of a flywheel and the latter carries the cam which moves film feeding shuttle up and down. The cam, the flywheel, and the shutter are coaxially disposed with relation to each other and rotate upon a common spindle. The flywheel is rotated by suitable driving mechanism and the shutter is operatively connected to the flywheel by a gear-train disposed in a compact manner on the opposite side of the shutter from the flywheel, preferably entirely within the periphery of the flywheel. A plurality of the gears in the train are coaxially disposed relative to the shutter and the flywheel, and the gears of the train are of definite proportions so that the ratio of rotation of the flywheel relative to the shutter is four rotations of the flywheel to three rotations of the shutter. The shutter in the present instance is formed with two segments, approximately quadrants, so that there are three interruptions of the light waves passing through the aperture during two rotations of the flywheel and its shuttle actuating cam, notwithstanding the fact that the shutter (due to a reduction of speed through a gear-train) moves at a slower speed of rotation than the speed of rotation of the flywheel and the cam.

The arrangement of the various parts of this mechanism is extremely compact and it is adapted for use upon a small motion-picture projector or motion-picture camera using a relatively narrow film such as employed in amateur cinematographic apparatus.

One of the aims of my invention is to provide a structure or apparatus of the kind herein described that is novel in the design and disposition of its parts, and which is also effective and dependable in performing the functions required of the device. A further aim of my invention is to provide a shutter, its related intermittent feed and cam-flywheel that are made up of simple but sturdy parts which will not readily get out of order, and which as a whole is economical to manufacture so that it may be cheaply produced and sold for a reasonable retail price, or, when incorporated in a complete motion picture apparatus will reduce the cost thereof.

Other advantages and objects of the present invention will be obvious to persons skilled in the art after the details and characteristics of the apparatus are understood from the following disclosure.

My invention embodies substantially the novel construction, combination, and arrangement of the parts hereinafter fully described, as illustrated in the accompanying drawings, and as finally pointed out in the claims appended hereto. My invention has been shown as a typical embodiment which is subject to modification without departure from the principles involved. The drawings are more or less schematic, and in the different views thereof, the same reference characters are used to identify like parts wherever they appear.

In the drawings:

Figure 1 is a vertical front elevation of my invention showing portions of the associated parts of a motion picture apparatus.

Figure 2 is a vertical section taken on line 2—2 of Figure 1 with the intermittent feed shuttle omitted for clarity, the view being slightly enlarged.

Figure 3 is a vertical elevation of the rear of the structure shown in Figure 1, the view being taken on the plane of line 3—3 in Figure 2.

Figure 4:
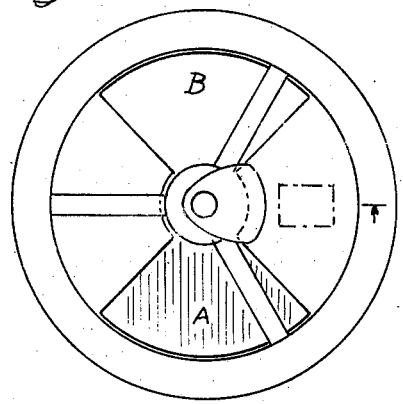
Figures 4, 5, 6 and 7 are schematic views or diagrams showing relative positions of the cam-flywheel and the shutter with respect to each other and the light aperture during the revolutions of the cam-flywheel.

In the drawings, 10 designates a vertical wall, partition or other suitable support upon which the major portions of this apparatus are mounted. This support is preferably within the casing of a motion picture projector or motion picture camera, and adjacent this support, or formed as a part of it, there is a suitable elongated guide 11 that is traversed by the film in an intermittent manner. This guide 11 is provided with an aperture 12 for the passage of light waves during the momentary pauses of the film traversing the guide. Suitable intermittent feed devices, to be later described, are adapted to impart a longitudinal movement to film in a downward direction along the film guide.

A horizontally disposed spindle 13 is mounted on the support 10 and provides an axle for certain portions of cam-flywheel and shutter mechanism. This spindle 13 has a reduced end portion that provides a shoulder 14 abutting the adjacent face of support 10 and the reduced portion is threaded and protrudes through an opening in the support and has a nut 15 screwed thereon to securely maintain the spindle in position. A cylindrical bearing block or spacer 16 is preferably loosely mounted on the spindle next to the support and the adjacent end flywheel hub 17 which extends along the spindle bears against this block 16.

The flywheel 18 has one of its faces hollowed out to provide a recess 19 which accommodates the shutter and preferably the devices for driving the shutter. The central portion of the flywheel is a substantially flat disk 20 and the hub 17 extends axially away from this disk in the manner shown in Figure 2 and there are a plurality of radiating spokes 21 that extend away from the disk 20 to the annular mass or rim of the flywheel. The means for driving the flywheel comprises a gear 22 that is secured to the central disk 20 of the flywheel and is anchored thereto by screws or pins 23. There is an extension 24 of the flywheel hub which projects outwardly from the disk and said gear 22 surrounds a portion of this hub extension. A pear-shaped or triangular cam 25 has its apex bored transversely to permit it to be secured over the outer portion of the hub extension 24 in the manner shown in Figure 2 and it is anchored, either to the hub extension 24 or to the gear 22 by means of a pin 26 as illustrated. This cam therefore rotates at the same speed as flywheel 18 and is adapted to actuate the reciprocating shuttle that moves up and down for intermittently feeding the film in a step-by-step downward direction. A large gear 27 meshes with the gear 22 that is secured to the flywheel and thus drives the flywheel at a rapid speed. This large gear 27 is schematically shown in broken lines in Figure 1 and derives its motion through suitable clock-work or other mechanical means that are either manually or motor actuated. The flywheel 18 will rotate in synchronized relation to the up and down movement of the shuttle due to the fact that the actuating cam 25 moves with the flywheel hub.

Figure 8:
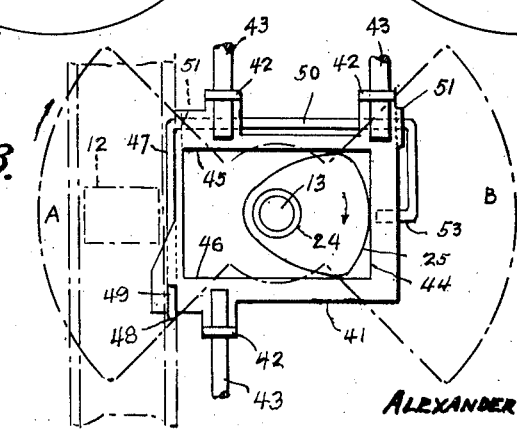
Figure 8 is an elevation of the intermittent feed shuttle and cam, showing the projection aperture, the film, and the shutter in dot-dash lines.

The shutter, which interrupts light waves passing through the aperture 12 in the film guide, is disposed coaxial with relation to the flywheel and it is mounted so as to rotate upon the hub of said flywheel. As shown in Figure 1 the shutter comprises two quadrant-shaped blades 28a and 28b that are diametrically disposed with respect to each other and extend radially from a central disk 29. The center disk 29 is provided with an opening to receive the flywheel hub 17 and a gear 30 which is loosely mounted on the hub 17 has the shutter disk 29 secured to it in any suitable manner, preferably by small screws 31. The gear 30 is upon the side of the shutter which is opposite the flywheel so that the shutter blades 28a and 28b will be rotatably disposed close to the flywheel and within the recessed face 19 of the latter. The arrangement of the shutter and the intermittent feed cam 25 is such that when the cam is in a horizontal position and extending away from the aperture the center of the cam and the center of the shutter blades are coincident. This disposition and relation is shown in Figure 8.

The shutter gear 30, which is loose on the hub 17, is adapted to be driven by a gear-train which derives its motion from the flywheel and the flywheel hub, and this gear-train is preferably of a speed reducing character so that during two rotations of the flywheel and cam the shutter will make one and one-half rotations. A gear 32 of smaller diameter and having fewer teeth than gear 30 is anchored to the flywheel hub 17 alongside said gear 30. A stub-spindle 33 projects from the support 10 preferably above the spindle 13, and provides means for mounting the transmission gears of the train. A bushing 34 surrounds the stub-spindle 33 in the manner shown in Figure 2 and extends from the support to the headed or flanged end 35 of the stub-spindle which is close to the adjacent face of the shutter. A small tube or sleeve 36 surrounds this bushing and a gear 37 is secured to it. A smaller gear 38 is disposed alongside the gear 37 and is pinned thereto so that these gears will rotate together.

The gears 22, 30 and 38 are preferably of the same diameter and have the same number of teeth thereon. The gear 32 is smaller than the said other gears, and the gear 37 is larger than the said other gears. The gear 32 is preferably provided with thirty-six teeth and the large gear 37 with forty-eight teeth, while the said other or remaining gears 22, 30 and 38 (which are of the same diameter) contain forty-two teeth. By this arrangement the shutter rotates at a slower speed than the flywheel at the ratio of two revolutions to one and one-half of the shutter. Owing to the fact that the shutter has two quadrants, there are two interruptions of light waves during a single rotation of the shutter so that the number of light interruptions will be doubled with the result that there are one and one-half light interruptions to one rotation of the flywheel or during one cycle of movement of the intermittent feed devices that are actuated by cam 25.

I have shown a typical or preferred form of intermittent feed mechanism for imparting the step-by-step movement to the film during which the film momentarily pauses or rests with one of its frames alined with the aperture in the guide. In this manner each period of pause or rest takes place after a blade of the shutter has moved past the aperture, and each period of film movement takes place while a blade of the shutter is passing or in alinement with the aperture to "black-out" or interrupt passage of light waves. It will be understood however that any other intermittent film feed mechanism may be employed with equal facility.

The film feed devices shown embody a shuttle 41 preferably of a somewhat rectangular shape having a plurality of ears 42 of L-shape at its upper and lower margins, which ears have holes in their lateral portions to receive a corresponding plurality of bearing pins or studs 43 permitting the shuttle to rapidly reciprocate in an up and down direction. The pins or studs are preferably stationary being secured or anchored to a convenient and adjacent portion of the apparatus. The shuttle is an open frame as shown so that a relatively large opening 44 is made in the central portion, the upper and lower margins of which opening provide opposing surfaces 45 and 46 that are horizontal and therefore transverse to the line of movement of the shuttle. The pear-shaped or triangular cam 25 disposed radial on the spindle 13, or the extension 24 of the flywheel hub, rotates in the opening 44 so that its edge engages the opposing surfaces 45 and 46 thereof and thus reciprocates the shuttle 41 during rotation of the cam-flywheel.

The shuttle is provided with means to engage and move the film during downward movement of the shuttle and then disengage the film during the upward or return movement of the shuttle.

For this purpose a swinging arm 47 is employed, which arm has a lateral finger 48 at its lower end that is adapted to enter the perforations along the margin of the film which are engaged through an open recess 49 at the lower edge of the shuttle. Arm 47 is a portion of a U-shaped device the cross member 50 of which rocks in lateral bearing lugs 51 at the upper portions of the vertical margins of the shuttle 41. The other arm 52 of this U-shaped member is substantially L-shaped with its lateral end portions 53 projected inward towards the axis of the cam 25 to engage the irregular shaped groove in the edge or periphery of a cam wheel 54 that is coaxial with the flywheel and rotates therewith. This cam wheel is adapted to swing the L-shaped arm 52 towards and away from the shuttle, thus correspondingly swinging the other arm 47 and its finger 48 into and out of the film perforations. It will be understood that while the shuttle is moving downward the finger 48 is engaged with the film and is withdrawn therefrom during upward movement of the shuttle.

Figure 5:
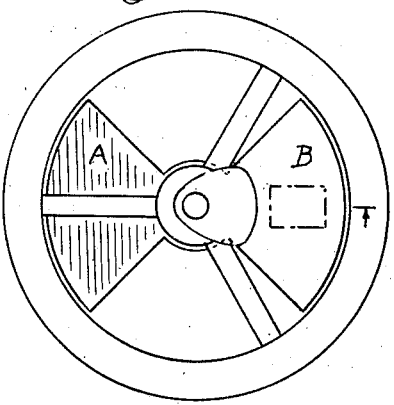
Figure 6:
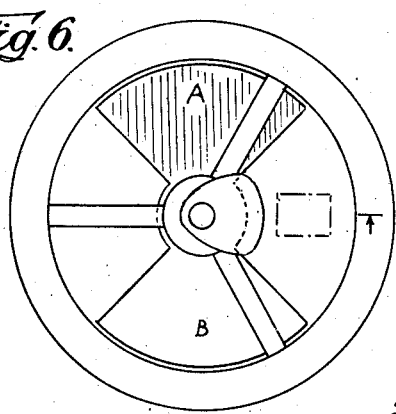

The diagrams, Figures 4, 5, 6 and 7 show different stages or periods during cycles of operation of the apparatus. In Figure 4 the cam-flywheel has made one rotation anticlockwise from the position shown in Figure 1 and the shutter blades have made three-fourths of a rotation. The blades of the shutter for convenience are designated in the diagrams as A and B corresponding respectively to the reference characters 28a and 28b used in the other views. The cam 25 in diagrams Figures 4, 5 and 6 is moving upward as indicated by arrows thereon, said upward movement being the period during which the film feed mechanism is disengaged from the film and the latter has momentarily paused at the light aperture. Figures 5 and 6 show successive complete rotations of the cam-flywheel and the proportionate rotations of the shutter blades with relation to the cam and light aperture.

Figure 7:
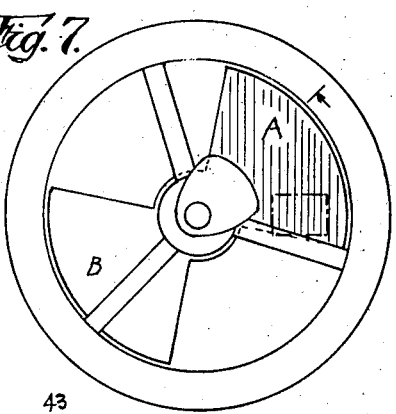

Figure 7 shows the cam 25 after the feed mechanism has traveled downward and has correspondingly advanced the next frame of the film to the aperture where it pauses during the lower swing of the cam and the adjacent shutter blades and flywheel spoke have just passed the light aperture thus exposing the picture frame. Thus it will be seen the spokes of the flywheel move in synchronized relation to the shutter blades and do not interfere with the exposure of the film.

What is claimed is:

1. In motion picture apparatus a rotatable cam-flywheel having a recessed face; a rotatable light interrupting shutter disposed in said recessed face; and a gear-train operatively connecting said flywheel and shutter, said gear train adapted to impart to the shutter a speed of rotation differing from the speed of rotation of the cam-flywheel.

2. In motion picture apparatus a rotatable cam-flywheel having a recessed face; a rotatable light interrupting shutter disposed in said recessed face and coaxial relative to said flywheel; and a gear-train operatively connecting said flywheel and shutter, said gear train adapted to impart to the shutter a slower speed of rotation relative to the speed of rotation of the cam-flywheel, a plurality of the gears of said train disposed coaxial to said flywheel and said shutter.

3. In motion picture apparatus a support; an intermittent feed device adapted to move a film past a light aperture; a spindle mounted on said support; a flywheel rotatably mounted on said spindle; means for rotating said flywheel; a cam element driven by said flywheel and adapted to actuate said intermittent feed device; a hub extending from said flywheel along said spindle; a gear loose on said hub and adapted for rotation thereon; a light interrupting shutter secured to and rotatable with said gear; a second gear adjacent said first gear and anchored to said hub; and a plurality of gears operatively connecting said first and second gears, whereby the gear-train comprising all of said gears is adapted to rotate said shutter at a speed slower than said flywheel.

4. In motion picture apparatus a rotatable cam-flywheel member; a rotatable light interrupter shutter member coaxial to said flywheel member; means for driving said flywheel member; a gear-train connecting said members certain gears of said train disposed coaxial to said members; and a spindle common to both of said members and to said coaxial gears of said train, said shutter member and said gear-train disposed within the confines of the circumference of said flywheel member.

5. In motion picture apparatus a rotatable flywheel having a recessed face; a cam element rotatable with said flywheel; intermittent film feed mechanism actuated by said cam; a light interrupting shutter disposed axial to said flywheel and rotatable in the recessed face thereof; means operatively connecting said flywheel and shutter, said means adapted to impart to the shutter a speed of rotation differing from the speed of rotation of said flywheel; and an apertured guide traversed by the film and past which said flywheel and shutter move in the same direction.

6. In motion picture apparatus a rotatable flywheel having a recessed face; an elongated hub projecting from said flywheel; a rotatable shutter loose on said hub and adapted to rotate thereon in the recessed face of said flywheel; means for driving said flywheel; and means supported on said hub and transmitting rotating movement of said flywheel to said shutter, which said transmitting means is adapted to impart to the shutter a speed of rotation differing from the speed of rotation of said flywheel.

7. In motion picture apparatus a rotatable flywheel; a rotatable shutter adjacent one side of said flywheel; a radial cam adjacent the other side of said flywheel; a common axle upon which said flywheel, said shutter and said cam rotate; said shutter disposed loose on said axle and disposed within the confines of said flywheel; means adapted to rotate said flywheel; and transmission means operatively connecting said flywheel and said shutter, said transmission means adapted to impart to the shutter a speed of rotation differing from the speed of rotation of said flywheel.

8. In motion picture apparatus a rotatable flywheel; a rotatable shutter adjacent one side of said flywheel; a radial cam adjacent the other side of said flywheel; a common axle upon which said flywheel, said shutter and said cam rotate; said shutter disposed loose on said axle and disposed within the confines of said flywheel; means adapted to rotate said flywheel; and speed-reduction transmission means operatively connecting said flywheel and said shutter, said transmission means adapted to impart to the shutter a speed of rotation that is slower than the speed of rotation of said flywheel.

9. In motion picture apparatus a vertical support; a horizontal axle projecting therefrom; a film guide provided with a light aperture past which the film moves in said guide; film feed devices adapted to impart an intermittent longitudinal movement to the film; cam means rotatable on said axle for actuating said film feeding devices; a rotatable flywheel on said axle; a rotatable shutter disposed loose on said axle adjacent said flywheel and coaxial thereto; and transmission means operatively connecting said flywheel and shutter, said transmission means adapted to impart to the shutter a speed of rotation differing from the speed of rotation of said flywheel.

10. In motion picture apparatus a rotatable cam-flywheel having a recessed face; a plurality of spaced radially disposed light interrupting blades rotatably positioned in said recessed face; and a gear-train operatively connecting said flywheel and said blades, said gear-train adapted to impart to the said blades a speed of rotation differing from the speed of rotation of the cam-flywheel.

ALEXANDER FERDINAND VICTOR.